United States Patent
Anouar

(10) Patent No.: US 8,474,592 B2
(45) Date of Patent: Jul. 2, 2013

(54) CURRENCY DISCRIMINATION

(75) Inventor: Fatiha Anouar, Glenmoore, PA (US)

(73) Assignee: MEI, Inc., Malvern, PA (US)

( * ) Notice: Subject to any disclaimer, the term of this patent is extended or adjusted under 35 U.S.C. 154(b) by 1 day.

(21) Appl. No.: 13/055,686

(22) PCT Filed: Jul. 29, 2009

(86) PCT No.: PCT/US2009/052093
§ 371 (c)(1),
(2), (4) Date: Apr. 8, 2011

(87) PCT Pub. No.: WO2010/014700
PCT Pub. Date: Feb. 4, 2010

(65) Prior Publication Data
US 2011/0186402 A1    Aug. 4, 2011

Related U.S. Application Data

(60) Provisional application No. 61/084,358, filed on Jul. 29, 2008.

(51) Int. Cl.
*G07F 7/04* (2006.01)

(52) U.S. Cl.
USPC .......................................... 194/206; 194/302

(58) Field of Classification Search
USPC .................. 194/206, 207, 302, 353; 209/534
See application file for complete search history.

(56) References Cited

U.S. PATENT DOCUMENTS

| 5,757,001 | A | 5/1998 | Burns |
| 6,038,952 | A | 3/2000 | Citron et al. |
| 6,402,025 | B1 | 6/2002 | Shepherd et al. |
| 6,799,670 | B1 | 10/2004 | Korecki |
| 6,889,215 | B2 | 5/2005 | Basir et al. |
| 2002/0009213 | A1* | 1/2002 | Rowe et al. .................. 382/115 |
| 2004/0050652 | A1* | 3/2004 | Voser ........................ 194/302 |
| 2006/0254876 | A1* | 11/2006 | Baudat ....................... 194/206 |
| 2007/0140551 | A1 | 6/2007 | He et al. |
| 2007/0154079 | A1 | 7/2007 | He et al. |
| 2007/0154099 | A1 | 7/2007 | He et al. |

FOREIGN PATENT DOCUMENTS

| EP | 1376484 A1 | 1/2004 |
| EP | 1544807 A2 | 6/2005 |
| GB | 1590930 | 6/1981 |
| GB | 2136498 A | 9/1984 |
| WO | 04/001683 A1 | 12/2003 |
| WO | WO 2006/050367 A2 | 5/2006 |

(Continued)

OTHER PUBLICATIONS

Ioannis Alexandropoulos, "Uncooled Infrared Imaging Face Recognition Using Kernel-Based Feature Vector Selection", Signals, Systems and Computers, pp. 613-617, Oct. 1, 2006.

(Continued)

*Primary Examiner* — Jeffrey Shapiro
(74) *Attorney, Agent, or Firm* — Mintz Levin Cohn Ferris Glovsky and Popeo, P.C.

(57) ABSTRACT

A reference data set used for classifying items of currency is established by obtaining at least one measured response from at least one known item of currency, projecting the measured response data from the known item of currency from a first space to a second space, and applying a reduction technique to the second space thereby reducing the complexity of the second space. The reference data set, which can be used for classifying items of currency, is thus represented by a subset of all measured responses obtained from the known item of currency.

21 Claims, 5 Drawing Sheets

FOREIGN PATENT DOCUMENTS

WO 2008/015489 A1 2/2008

OTHER PUBLICATIONS

Zhan-Li Sun, et al., "Using FCMC, FVS, and PCA Techniques for Feature Extraction of Multispectral Images", IEEE Geoscience and Remote Sensing Letters, vol. 2, No. 2, pp. 108-112, Apr. 1, 2005.

Baudat G., et al., "Feature Vector Selection and Projection Using Kernels", Neurocomputing, Elsevier Science Publishers, Amsterdam, vol. 55, No. 1/02, Sep. 1, 2003, pp. 21-38.

PCT/ISA/210; PCT International Search Report, PCT/US2009/052093, Sep. 21, 2009.

* cited by examiner

CURRENCY DISCRIMINATION

CROSS-REFERENCE TO RELATED APPLICATION

This application is a national phase filing under 35 U.S.C. §371 of international application number PCT/US2009/052093, filed Jul. 29, 2009, which claims the benefit of priority of U.S. Provisional Patent Application Ser. No. 61/084,358, filed on Jul. 29, 2008, the contents of which are incorporated herein in their entirety.

FIELD OF THE DISCLOSURE

The disclosure relates to discriminating items of currency, and, in particular, relates to discriminating one class of items of currency from a different class of items of currency using a reference data set obtained using a reduction technique.

BACKGROUND

There are various known techniques for discriminating between genuine items of currency and non-genuine items of currency. For the purposes of the disclosure an item of currency includes, but is not limited to, banknotes, valuable documents, checks, security documents, coins, tokens, coupons, or any other item of currency (genuine or non-genuine) used in exchange for goods and services.

The discrimination between genuine items of currency and non-genuine items of currency is often used in automated transaction devices. Automated transaction devices include, but are not limited to, Automated Teller Machines (e.g., ATMs), vending machines, automated kiosks, and gaming machines. In such devices, items of currency are inserted into the machine and are evaluated by a validation unit to determine genuineness. Inserted items of currency determined to be genuine are accepted into the machine (e.g., either permanently or temporarily) in exchange for goods or services. Items of currency inserted into the machine that are determined to be non-genuine can be rejected and returned to the user or held within the machine to prevent further circulation of the inserted non-genuine items of currency.

The validation unit evaluates inserted items of currency using known techniques such as optical response (e.g., reflectance and/or transmission in at least one wavelength), electromagnetic response (e.g., inductance or impedance), or physical dimension analysis (e.g., thickness, weight, or size). In the case of optical response, multiple locations of an inserted item of currency are evaluated relative to a known genuine item of currency to determine whether the inserted item is a genuine item of currency or a non-genuine item of currency. In other implementations, the multiple locations correspond to measurements of local electro-magnetic response of a coin item for example, especially when the coin is made of different materials such as bi-color coins. Typically the locations used for evaluating an inserted item of currency are selected manually by inspection of known genuine items of currency so that a high acceptance rate can be obtained while minimizing the acceptance of non-genuine items of currency. Often the manual selection process is performed by visual inspection. A limitation of such manual selection processes is that it is labor intensive and often expensive to determine which specific locations on a items of currency provide a good ability to discriminate genuine items of currency from non-genuine items of currency.

SUMMARY

The disclosure relates to discriminating between items of currency. A method and apparatus are provided for discriminating between at least two different classes of items of currency (e.g., between denominations). Also disclosed is a method for determining the specific measurements to be evaluated on an inserted item of currency which are used to determine if the inserted item of currency is genuine or non-genuine. The selection of specific locations to be evaluated on an inserted item of currency can be determined using at least one known genuine item of currency. In some implementations, the selection of specific measurements to be evaluated on an inserted item of currency can be determined using at least one known genuine item of currency and at least one known non-genuine item of currency (e.g., a forgery or copy). In some implementations, the selection of specific measurements to be evaluated on an inserted item of currency can be determined using at least one denomination (e.g., a first class) and at least one other denomination (e.g., a second class). The selection of specific measurements (e.g., locations on an item of currency) used to discriminate between a genuine item of currency and a non-genuine item of currency (or between denominations) can be a result of statistical analysis of multiple measurements such that the most relevant measurements are used.

In some implementations, the number of specific measurements selected to be used in discriminating between items of currency is determined based on system specifications of the machine evaluating inserted items of currency as either genuine or non-genuine. For example, the number of specific measurements used for discrimination can be a function of the processing speed and/or the memory space provided by the automated transaction machine. In some implementations, the number of specific measurements used for discrimination can be a function of the desired performance (e.g., acceptance rate) in distinguishing between items of currency.

In some implementations, a method of establishing at least one reference set of data (e.g., optical response at specific locations) for at least one genuine item of currency is developed by determining the optimal measurement(s) for a known genuine item of currency that provide a heightened ability to discriminate genuine items of currency from non-genuine items of currency. In some implementations, a reference data set is established by obtaining response data from a known genuine item of currency (e.g., a $10 U.S. note), transforming the response data from a first multi-dimensional space to a second multi-dimensional space, selecting a subset of axes from the second multi-dimensional space, and reducing the number of variables used to represent each axis in the subset of axes of the second multi-dimensional space.

In some implementations, the response data obtained from a genuine item of currency is optical response data from multiple locations within the item. More specifically, a sensing unit emits light in at least one wavelength and detects at least the reflected or transmitted light from the item of currency. In other implementations, the response data obtained from an item of currency is spectral response information. In yet other implementations, the spectral response information is used to obtain component spectral response information using a color space (e.g., CIE XYZ space or CIE Lab space). An example of such a technique is disclosed in a U.S. patent application, entitled "CLASSIFYING AND DISCRIMINATING AN ITEM OF CURRENCY BASED ON THE ITEM'S SPECTRAL RESPONSE" (Ser. No. 61/137,386), which is incorporated herein by reference in its entirety. The component spectral response information can include a fundamental metamer and a black metamer. The response data obtained from the genuine item of currency is then transferred from a first multi-dimensional space (i.e., first space) to a second multi-dimensional space (i.e., second space). For example, Principle Component Analysis (PCA) can be used to transfer the genuine response data from a first multi-dimensional space to a second multi-dimensional space (i.e., PCA space). Principle Component Analysis is a well-known statistical tool and can be interchanged with any other commonly known tool such as Linear Discriminate Analysis (LDA). Each axis of the PCA space is represented by a linear combination of all the original response data (i.e., variables) wherein each has an associated weighting factor. To reduce complexity, a subset of the PCA space axes can be selected. Selection of a subset of PCA axes can be accomplished by picking a group of the axes (e.g., a first group). In some implementations, an axis reduction technique can be used to select the most relevant axes (e.g, any combination of the original axes) of the PCA space. An example of a known axis reduction technique is Feature Vector Selection (FVS). A Feature Vector Selection algorithm is described in pending U.S. patent application Ser. No. 10/518,691 (published as 2006/0254876), which is expressly incorporated herein by reference in its entirety. Since each subset of PCA axes is still represented by all of the original variables from the original response data (genuine data), it is desirable to further reduce the complexity. The complexity of the subset of PCA axes can be reduced further using a variable reduction technique wherein the number of variables representing each subset PCA axis is reduced. Since the reduction of variables used for each subset PCA axis is an approximation of the original subset PCA axes, the weighting factor for each of the remaining variables is modified through the variable reduction technique. Again, an FVS algorithm can be used as a variable selection technique. The resulting subset of PCA axes, each having a reduced number of variables used to represent it, establishes a reference data set for a genuine item of currency used. The reference data set represents each of the subset of variables, and their associated weighting factor, for each of the subset of PCA axes.

PCA is a technique in which the optimized criterion is the maximum of variance. It is common to use PCA to select the most relevant component axes as those that maximize the variance. In some implementations of the invention, the most relevant axes in the PCA (e.g., second) space are selected using a reduction technique including, but not limited to, FVS, stepwise regression, or forward selection.

In some implementations, a reference data set representing specific weighted measurements of the at least one genuine item of currency is compared to results obtained from an inserted item of currency to determine if the responses obtained from the inserted item of currency are within an acceptable tolerance range when compared to the reference data set (responses). For example, an inserted item of currency is evaluated using a known evaluation technique (e.g., optical response) at a specific location identified by the reference data set.

Also disclosed is an apparatus for discriminating genuine items of currency from non-genuine items of currency (or one denomination from another). More specifically, an automated transaction machine (e.g., gaming machine or vending machine) can be adapted to evaluate inserted items of currency and compare the evaluation responses (e.g., optical or spectral) with at least one reference data set of responses indicative of at least one genuine item of currency (or a specific denomination). The inserted item of currency is characterized as genuine if the comparison of the inserted item responses falls within a predefined tolerance when compared to those of the reference data set. The inserted item of currency is characterized as non-genuine if the comparison of the inserted item responses falls outside a predetermined tolerance when compared to those of the reference data set. Alternatively, the inserted item of currency may be determined as either belonging to a class or not belonging to a class using similar comparisons.

Also disclosed is a method for discriminating a genuine item of currency from a non-genuine item of currency wherein a reference data set of responses is weighted according to the multi-step reduction method. At least one reference data set including weighted specific measurement responses of at least one genuine item of currency is stored for use within an automated transaction machine. An item of currency is inserted into the automated transaction machine, and response data is obtained from the inserted item at specific locations identified by the reference data set. The inserted item response data is weighted according to the identified reference data set and compared to at least one reference data set. A determination (e.g., classification) that the inserted item of currency is genuine is made if the comparison falls within a predefined tolerance and non-genuine if the comparison falls outside a predetermined tolerance, for each reference data set compared.

Various aspects of the invention are set forth in the claims. Additional features and various advantages will be readily apparent from the following description and the accompanying drawings.

DETAILED DESCRIPTION

Figure 1:
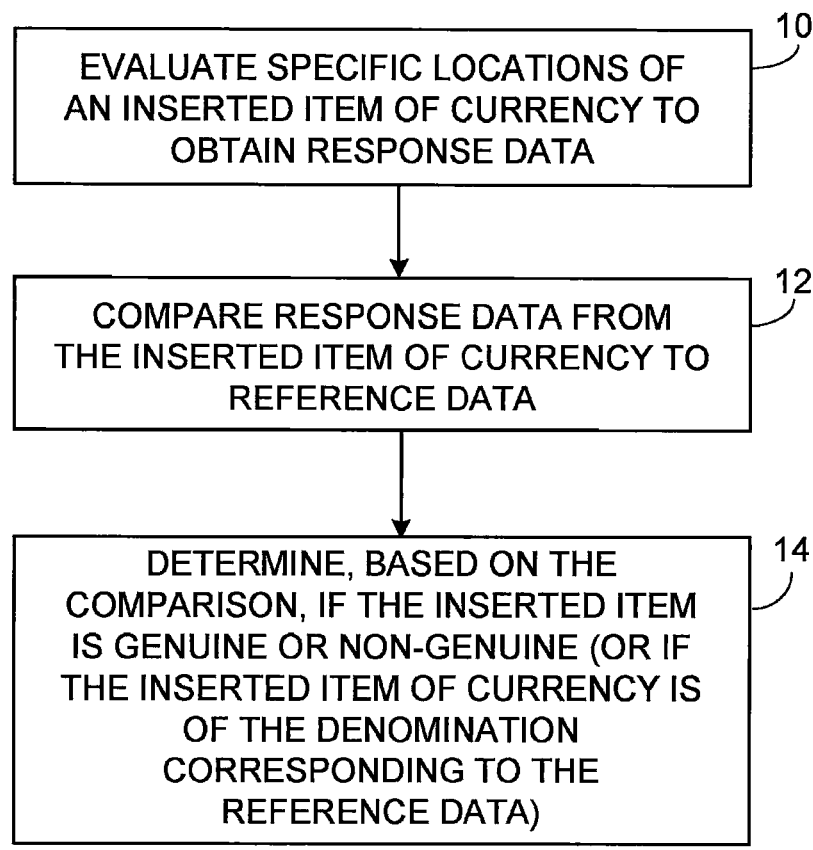
FIG. 1 is a flow chart showing an example of a method for evaluating an item of currency according to the invention.

The disclosure relates to discriminating genuine items of currency from non-genuine items of currency (or more generally one class from another, where a class can be a denomination or a group of denominations, for example). An automated transaction machine (e.g., vending machine or gaming machine) includes a validation unit of evaluating inserted items of currency. Typical evaluation techniques for evaluating inserted items of currency include, but are not limited to, optical response (e.g., reflection and/or transmission) in at least one of visible or non-visible wavelength, electromagnetic response (e.g., inductance or impedance), and physical characteristics (e.g., thickness, size, shape, material). A validation unit employs at least one evaluation technique to obtain response data from an inserted item of currency. In some implementations, the validation unit uses known optical response techniques (e.g., detection of light emitted from a source and reflected by or transmitted through the inserted item of currency) to obtain an optical response from the inserted item of currency. In some implementations, specific locations of the inserted item of currency are evaluated optically to obtain an associated response (FIG. 1, block 10). The response data from the inserted item of currency is compared to at least one reference data set (e.g., response data from a genuine item of currency) (FIG. 1, block 12) to determine if the inserted item is genuine or non-genuine (or of the denomination corresponding to the reference data set) (FIG. 1, block 14) as will be described in greater detail below.

A reference data set is used for comparing inserted items of currency with genuine items of currency and can be established according to various implementations described below. The reference data set can include the identification of specific locations (or data measurements) to be evaluated on an inserted item of currency, and weighting factors associated with each measurement of the identified specific locations. In some implementations, the reference data set further includes a threshold value obtained by using a support vector machine (SVM) algorithm with input variables defined by the weighted measurements of specific measurements of the reference data set. There are many Support Vector Machine algorithms; one example can be understood from an international patent application having Publication No. WO 2008/015489, which is incorporated herein by reference in its entirety.

Figure 2:
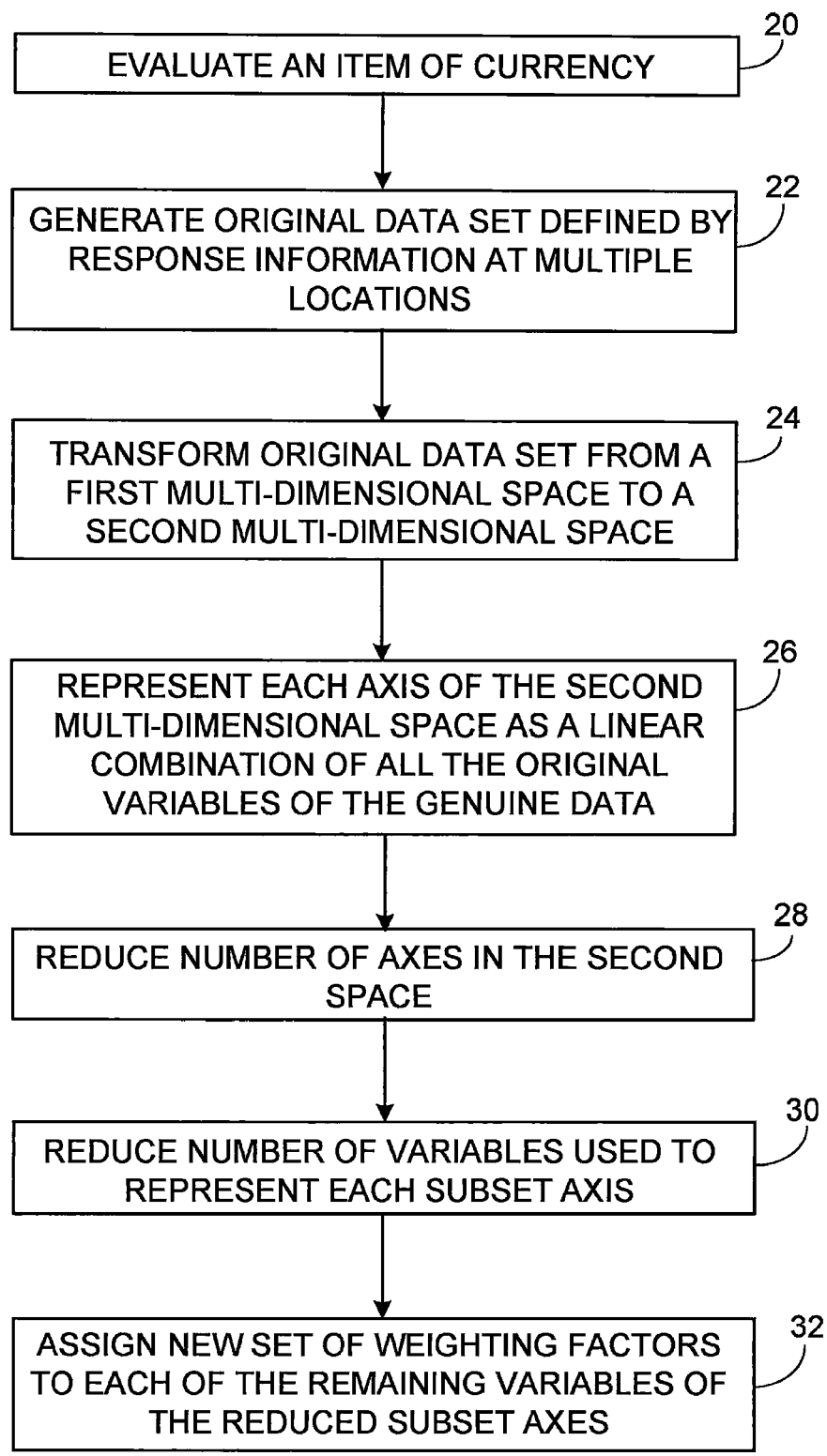
FIG. 2 is a flow chart showing an example of a method for establishing reference date for use in evaluating an item of currency according to the invention.

To establish a reference data set, a genuine item of currency is evaluated using a known evaluation technique (e.g., spectral response evaluation) (FIG. 2, block 20). An original data set is generated from a genuine item of currency defined by response information at multiple locations (FIG. 2, block 22). For example, each data (variable) in the data set corresponds to response information (e.g., optical reflectance) at a specific location (spot) on the genuine item of currency. The original data set (genuine data) is transformed from a first multi-dimensional space to a second multi-dimensional space (FIG. 2, block 24). Examples of techniques used to transform the genuine data from a first multi-dimensional space to a second multi-dimensional space include, but are not limited to, Principle Component Analysis (PCA) or Linear Discriminant Analysis (LDA). Once the genuine data has been projected onto a second multi-dimensional (e.g., PCA) space, each axis of the second multi-dimensional space is represented as a linear combination of all the original variables of the genuine data (FIG. 2, block 26). Therefore, each variable on each of the axes in the second space has a weighting factor associated thereto. In some implementations, the genuine data is projected from a first multi-dimensional space to the PCA space. Transformation into the PCA space will be used in the rest of the disclosure as an example, but is not intended to limit the scope of the disclosure.

The size and complexity of the PCA space is such that it is not practical to use all the variables and all the PCA axes for discrimination of genuine items of currency from non-genuine items of currency (or one denomination from another). Memory space and processing speed are common limitations of automated transaction machines and, therefore, discrimination using all the PCA data is impractical. For example in order to satisfy the memory and processing requirements of a typical automated transaction machine, it is desirable to have the number of axes of the second space reduced from the number of axes available from the PCA process.

In some implementations the number of axes in the second space are reduced by selecting a subset of axes deemed to be the most relevant (FIG. 2, block 28). In some implementations, only genuine data is projected onto the PCA space and therefore a simple selection of a subset of PCA axes can be accomplished by selecting a group of PCA axes. In other implementations, response data from a genuine item of currency and response data from a known non-genuine item of currency (e.g., a forgery) are projected onto the PCA space. In yet further implementations, response data from a given denomination (e.g., a first class) and response data from at least one further denomination (e.g., a second class) are projected onto the PCA space. When more than one class is projected onto the PCA space, the subset of PCA axes can be selected using an axis reduction technique such as FVS, or any other known reduction technique.

The application of an axis reduction technique allows for the selection of a subset of PCA axes to be made based on relevance rather than size. In some implementations, the reduction technique used to find a subset of PCA axes is conducted to obtain a predetermined number of PCA axes (e.g., four). In other implementations, the number of subset PCA axes is determined based on a desired performance level (e.g., accuracy).

The subset of axes in the PCA space are still represented as a linear combination of all the original genuine variables. To further reduce the amount of information representative of the genuine data, it is desirable to reduce the number of variables used to represent each subset PCA axis (FIG. 2, block 30). To accomplish this, a variable reduction technique is applied to each of the subset PCA axes. Examples of variable reduction techniques include, but are not limited to, FVS, stepwise regression, or ridge regression. In some implementations, FVS is used as a variable reduction technique on the subset PCA axes. The results from performing FVS on each subset PCA axis, provides a new linear combination of a reduced number of variables used to represent each subset PCA axis. Since the reduced number of variables representing each subset PCA axis is an approximation of each subset PCA axis using all the genuine variables, a new set of weighting factors are assigned to each of the remaining variables of the reduced subset PCA axes (FIG. 2, block 32).

Since the variables used to represent each PCA axis can correspond to measurements taken at specific locations on the genuine item of currency, transforming the original data to the PCA space, reducing the number of PCA axes to a subset of PCA axes, and then reducing the number of variables used to represent each subset PCA axis, a specific number of locations (spots) on the item of currency, each having an associated weighting factor, can be identified. The reference data set can, therefore, be characterized as at least representing specific locations on the genuine item of currency, each having a specific weighting factor assigned thereto, having been reduced from all the possible specific locations using the foregoing reduction method. In some implementations, the multi step reduction technique can result in a reduced number of measurements from all the possible measurements.

An example of the output (i.e., reference data set) from the reduction method is described below:

$$Y_1 = W_1 X_1 + W_2 X_2 + W_3 X_3 + W_4 X_4 + W_5 X_5$$

$$Y_2 = W'_1 X'_1 + W'_2 X'_2 + W'_3 X'_3 + W'_4 X'_4$$

$$Y_3 = W''_1 X''_1 + W''_2 X''_2 + W''_3 X''_3 + W''_4 X''_4 + W''_5 X''_5 + W''_6 X''_6$$

$$Y_4 = W'''_1 X'''_1 + W'''_2 X'''_2 + W'''_3 X'''_3$$

$$Y_5 = W''''_1 X''''_1 + W''''_2 X''''_2 + W''''_3 X''''_3 + W''''_4 X''''_4 + W''''_5 X''''_5 + W''''_6 X''''_6 + W''''_7 X''''_7$$

Here $Y_1$ to $Y_5$ represent a subset of PCA space axes (i.e., five axes) obtained using the reduction technique of the disclosure. For each axis in the above example, W is the specific weighting factor for a specific variable (X) of a specific axis (Y). It can be seen that each variable (e.g., specific location response) is given a specific weighting factor for each remaining PCA axis.

In some implementations, the reference data set further includes a reference threshold value obtained by using an SVM algorithm having input variables defined by the linear combination of each subset PCA axis variables and their associated weighting factors. In some implementations, classification techniques (e.g., Mahalanobis Distance (MD)) can be used to classify an inserted item as belonging to a given class (e.g., denomination or genuine/non-genuine). Each subset PCA axis can be formed as a linear combination of as many subset PCA axis variables, and their associated weighting factors, as determined using the disclosed multi-step reduction method.

In some implementations, there can be more than one reference threshold value found using the SVM algorithm (or MD classification technique). An inserted item of currency can be classified as belonging to a class (represented by a reference data set) if the tested response falls between an upper and lower reference threshold value of at least one reference data set.

It is contemplated that in order to obtain a reference data set for a given class, many (e.g. 200) examples of a given genuine item of currency (or denomination) may be evaluated. More specifically, for each example of a known genuine item of currency, a reduced subset of PCA axes can be obtained using the multi-step method of the disclosure and used as input variables to a SVM algorithm or MD classification technique to obtain at least one threshold value.

Figure 3:
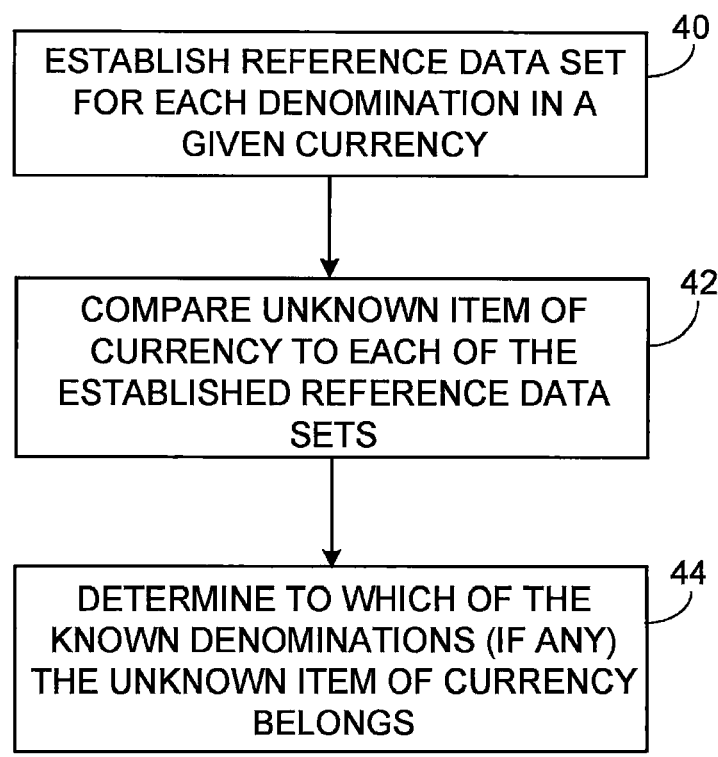
FIG. 3 is a flow chart showing an example of a method for determining to which one of multiple denominations an item of currency belongs according to the invention.

In some implementations of the disclosure, a method of discriminating between genuine items of currency and non-genuine items of currency is used wherein a reference data set, as defined by the disclosure, is used for comparison with response data obtained from an unknown item of currency. In some implementations, there can be provided a reference data set obtained using the reduction technique of the disclosure for each denomination within a given currency. For example, using the reduction technique of the disclosure, a reference data set can be established for each denomination in a given currency (e.g., US $1, $5, $10, $20, etc.) (FIG. 3, block 40). It is contemplated that the comparison between at least one reference data set and at least one unknown item of currency is carried out to determine if the unknown item of currency belongs to a given denomination (i.e., class). When multiple reference data sets are available, an unknown item of currency can by compared to each of the established reference data sets (FIG. 3, block 42) to determine if the unknown item of currency belongs to any of the known denominations (i.e., classes) (FIG. 3, block 44).

Although the disclosure has been described as relating to specific locations on an item of currency, the techniques can be applied to other features of an item or currency. Examples include, but are not limited to, complex impedance's, physical dimensions or other features capable of providing a measured response.

Figure 4:
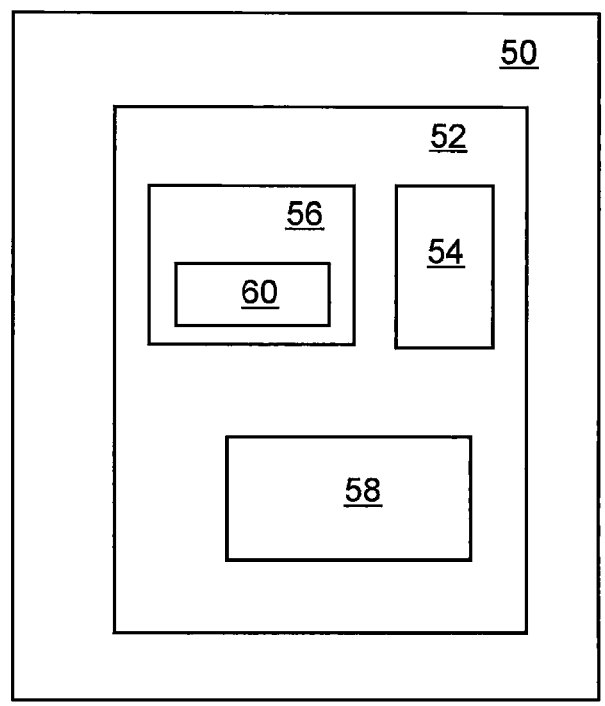
FIG. 4 is a block diagram showing an example of an automated transaction machine with a currency validation unit according to the invention.

As illustrated in FIG. 4, in some implementations, an automated transaction machine 50 includes a validation unit 52 for discriminating between an unknown item of currency and at least one known denomination (or class). The validation unit can include a sensing unit 54, memory unit 56 and a processing unit 58 such as a microprocessor. The validation unit has at least one reference data set 60 (generated by using the multi-step method of the disclosure) stored therein for comparison with an inserted item of currency.

The inserted item of currency is tested, for example, according to a known evaluation technique (e.g., optical response or spectral response) to obtain response data. In some implementations, the validation unit is arranged to obtain a measured response from the inserted item of currency at the location specified by the at least one reference data set (see FIG. 1). In other implementations, the validation unit is adapted to obtain measured responses from the entire item of currency and the specific response data corresponding to each specific locations (or specific measurements), as defined by at least one of the reference data sets, can be extracted for comparison.

Once the measured response from the inserted item of currency has been obtained from the specific locations (or measurements), as defined by a specific reference data set, the same weighting factors used in the reference data set at each of the specific locations are applied to the measurements obtained from the inserted item of currency. For example, a reference data set is defined by the variables and weights below (where each variable X represents a specific location on the genuine item of currency). Alternatively, each variable X represents a specific measured response of a genuine item of currency.

$$Y_1 = W_1 X_1 + W_2 X_2 + W_3 X_3 + W_4 X_4 + W_5 X_5$$

$$Y_2 = W'_1 X'_1 + W'_2 X'_2 + W'_3 X'_3 + W'_4 X'_4$$

$$Y_3 = W''_1 X''_1 + W''_2 X''_2 + W''_3 X''_3 + W''_4 X''_4 + W''_5 X''_5 + W''_6 X''_6$$

$$Y_4 = W'''_1 X'''_1 + W'''_2 X'''_2 + W'''_3 X'''_3$$

$$Y_5 = W''''_1 X''''_1 + W''''_2 X''''_2 + W''''_3 X''''_3 + W''''_4 X''''_4 + W''''_5 X''''_5 + W''''_6 X''''_6 W''''_7 X''''_7$$

A new set of linear combinations ($A_1$ to $A_5$) corresponding to the subset of PCA axes using the obtained response data from the inserted item of currency can be established. Here each specific variable B represents a response from each of the specific locations, defined by the reference data set, from the inserted item of currency. Alternatively, each variable B represents a specific measured response of a genuine item of currency. Therefore:

$$A_1 = W_1 B_1 + W_2 B_2 + W_3 B_3 + W_4 B_4 + W_5 B_5$$

$$A_2 = W'_1 B'_1 + W'_2 B'_2 + W'_3 B'_3 + W'_4 B'_4$$

$$A_3 = W''_1 B''_1 + W''_2 B''_2 + W''_3 B''_3 + W''_4 B''_4 + W''_5 B''_5 + W''_6 B''_6$$

$$A_4 = W'''_1 B'''_1 + W'''_2 B'''_2 + W'''_3 B'''_3$$

$$A_5 = W''''_1 B''''_1 + W''''_2 B''''_2 + W''''_3 B''''_3 + W''''_4 B''''_4 + W''''_5 B''''_5 + W''''_6 B''''_6 W''''_7 B''''_7$$

In some implementations, the new set of linear combinations ($A_1$ to $A_5$) can be used with a classification technique (e.g., MD) to determine whether an inserted item is a member of the class associated with the particular reference data set. The validation unit can be configured to compare the threshold value from a reference data set to the inserted item of currency to determine if the inserted item of currency is a member of the genuine of the type (or class) of currency represented by the reference data set. In other implementations, the determination of whether the inserted item of currency is genuine or non-genuine (or a member of a known class) is made based on the comparison of the inserted item of currency and an upper and lower threshold from the at least one genuine item of currency.

Figure 5:
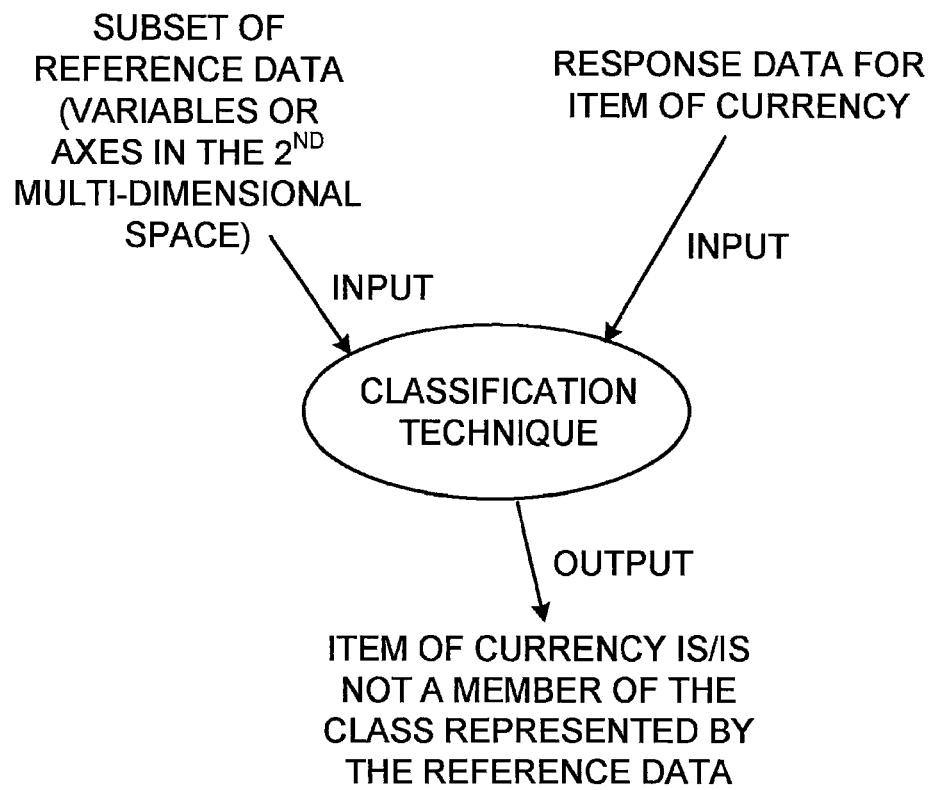
FIG. 5 illustrates an example of a conceptual model for a currency classification technique with data inputs according to the invention according to the invention.

In some implementations, there is provided a classification step for classifying an inserted item of currency as a member of a respective class of at least one reference data set. As illustrated by FIG. 5, the subset of variables (or second space axes) are used in combination with the obtained response information of an inserted item of currency as input variables to a classification technique. The classification technique can include, but is not limited to, SVM or MD.

Using the example discussed above, the subset of second space axes $Y_1$ to $Y_5$ (e.g., part of a reference data set) and the response information obtained from an inserted item of currency represented by $A_1$ to $A_5$ are used as inputs for a classification technique such as MD. Based on the output from performing the MD classification technique, the inserted item of currency can be classified as either a member of the class represented by the reference data set, or a non-member of the class represented by the reference data set. There can be many reference data sets for each class (e.g., similar to the representations exemplified by $Y_1$ to $Y_5$), and the response information from an inserted item of currency (e.g., $A_1$ to $A_5$) can be used with each respective reference data set as inputs to a classification technique to determine if the inserted item of currency is a member of any of the classes represented by each reference data set. The validation unit store each of the respective reference data sets. The validation unit can be arranged to carry out the classification technique using any reference data set stored therein, and at least one inserted item of currency response information.

In some implementations, the validation unit is configured to store at least one reference data set corresponding to a given class (e.g., denomination). The at least one reference data set can be stored as a set of linear representations corresponding to at least one second space axis as determined using the multi-step method described in this disclosure. The measured response information of an inserted item can be represented by the validation unit as a new set of linear combinations of the identified group of second space axes. A classification technique can be used, having inputs as the set of linear combinations of the identified second space axes of the at least one reference data set and the new set of linear combinations of the identified second space axes of the inserted item of currency. The validation unit can be configured to create the linear combinations of the identified second space axes from the at least one reference data and the inserted item of currency as used for classification. The validation unit can be further adapted to perform the classification based on the at least one reference data set and the inserted item of currency response information (or any modification of the response information thereof).

Other implementations are within the scope of the claims.

What is claimed is:

1. A method for implementation by one or more data processors forming part of at least one computing system and for establishing at least one reference data set used for classifying items of currency, the method comprising:
obtaining at least one measured electromagnetic response from at least one known item of currency;
projecting, using at least one data processor, the measured electromagnetic response from the at least one known item of currency from a first multi-dimensional space to a second multi-dimensional space;
applying, using at least one data processor, at least one axis reduction technique to the second multi-dimensional space thereby selecting a subset of axes of the second space, wherein the at least one reference data set used for classifying items of currency is represented by a subset of all measured responses obtained from the at least one known item of currency; and
applying, using at least one data processor, at least one variable reduction technique to the subset of axes of the second space, wherein the at least one variable reduction technique obtains an approximation of the original subset of axes of the second space.

2. A method according to claim 1 wherein the axis reduction technique includes selecting a group of age more relevant axes of the second space.

3. A method according to claim 1 wherein the axis selection techniques includes selecting a group of small less relevant axes of the second space.

4. A method according to claim 1 wherein the axis reduction technique is chosen from the group consisting of FVS or MD.

5. A method according to claim 1 wherein the variable reduction technique is chosen from the group consisting of: FVS, MD, ridge regression or stepwise regression.

6. A method according to claim 1 wherein each specific electromagnetic measurement of the reference data set includes a weighting factor.

7. A method according to claim 1 wherein each axis of the second space is represented by a linear combination of all variables obtained in the first space.

8. A method according to claim 1 further including obtaining at least one measured electromagnetic response from at least one known non-genuine item of currency.

9. A method according to claim 1 wherein the at least one measured response is representative of the optical response of the item of currency when irradiated in at least one wavelength.

10. A method according to claim 1 wherein the projection of the at least one measured response from the first space to the second space is performed using principle component analysis.

11. A method according to claim 1 wherein the projection of the at least one measured response from the first space to the second space is performed using Linear Discriminant Analysis.

12. A method according to claim 1 wherein the at least one reference data set includes at least one threshold value.

13. A method according to claim 10 wherein the at least one threshold value is obtained using SVM.

14. A method according to claim 11 wherein inputs used for obtaining the at least one threshold value using SVM are the subset of variables used to approximate at least one axis in the second space.

15. A method according to claim 1 wherein a classification technique is used to determine if an inserted item of currency is a member of the class represented by the at least one reference data set.

16. A method according to claim 1 including storing the reference data set in a currency validator.

17. A method of distinguishing between items of currency for implementation by a currency validation unit, the method comprising:
sensing, using the currency validation unit, an inserted item of currency to obtain electromagnetic response information corresponding to a reduced set of measured electromagnetic responses on the inserted item of currency, the reduced set of measured electromagnetic responses defined by at least one reference data set for a known item of currency established using a multi-step reduction technique, wherein the multi-step reduction technique includes projecting the measured electromagnetic response information from a first multi-dimensional space to a second multi-dimensional space, selecting a subset of axes of the second multi-dimensional space, and applying a variable reduction technique to the subset of axes of the second multi-dimensional space to obtain an approximation of the subset of axes of the second multi-dimensional space;

weighting data from the measured electromagnetic responses using weighting factors defined by at least one reference data set for each respective response;

comparing the weighted response data set of the inserted item of currency to the at least one reference data set, and characterizing the inserted item of currency as a member of the class corresponding to the at least one known item of currency when the comparison is within a predefined tolerance or characterizing the inserted item of currency as not a member of the class corresponding to the at least one known item of currency when the comparison is outside of a predetermined tolerance.

18. An apparatus for discriminating items of currency comprising:

a memory unit storing at least one reference data set for at least one known item of currency, the at least one reference data set representing measured electromagnetic responses from sensing the at least one known item of currency, the at least one measured electromagnetic response on the at least one known item of currency having been identified using a multi-step reduction technique, wherein the multi-step reduction technique includes projecting the measured electromagnetic response information from a first multi-dimensional space to a second multi-dimensional space, selecting a subset of axes of the second multi-dimensional space, and applying a variable reduction technique to the subset of axes of the second multi-dimensional space to obtain an approximation of the subset of axes of the second multi-dimensional space;

a sensing unit to sense inserted items of currency, wherein the sensing unit is arranged to sense an inserted item of currency to obtain measured electromagnetic response information from the inserted item of currency based on the corresponding measured electromagnetic response information defined in the at least one reference data set;

a processing unit to compare an output from the sensing unit to the at least one reference data, and to characterize the inserted item of currency as a member of the class corresponding to the at least one known item of currency if the comparison of the sensing unit output and the at least one reference data set falls within a predetermined tolerance, or to characterize the inserted item of currency as not a member of the class corresponding to the at least one known item of currency if the comparison of the sensing unit output and the reference data set falls outside of a predetermined tolerance.

19. An apparatus according to claim 18 wherein the processing unit is arranged to modify the output of the sensing unit so as to classify the inserted item of currency as either being a member of the respective class of the at least one reference data set or not a member of the respective class of the at least one reference data set.

20. An apparatus according to any one of claims 18 wherein the processing unit is further arranged to compare the output from the sensing unit to each of the at least one reference data sets in order to classify the inserted item of currency as a member or non-member of each of the respective classes.

21. A method according to claim 17, wherein the method is performed by a currency validation unit.

\* \* \* \* \*